United States Patent [19]

Adachi et al.

[11] Patent Number: 4,940,843

[45] Date of Patent: Jul. 10, 1990

[54] METHOD OF PRODUCING NON-OXIDE CERAMIC SINTERED BODIES

[75] Inventors: Masakazu Adachi, Nagoya; Kaname Fukao, Inuyama, both of Japan

[73] Assignee: NGK Insulators, Ltd., Japan

[21] Appl. No.: 325,985

[22] Filed: Mar. 20, 1989

[30] Foreign Application Priority Data

Mar. 24, 1988 [JP] Japan .................................. 63-68278

[51] Int. Cl.$^5$ ............................................. C04B 35/58
[52] U.S. Cl. ........................................ 264/65; 264/66; 264/67
[58] Field of Search .............................. 264/65, 66, 67

[56] References Cited

U.S. PATENT DOCUMENTS 4,702,869 10/1987 Higuchi et al. ...................... 264/65
4,801,414 1/1989 Soma et al. ........................... 264/65

FOREIGN PATENT DOCUMENTS 55-20259 2/1980 Japan .

Primary Examiner—James Derrington
Attorney, Agent, or Firm—Arnold, White & Durkee

[57] ABSTRACT

A non-oxide ceramic sintered body is produced by calcining, before sintering, a non-oxide ceramic shaped body in an atmosphere having a particular partial oxygen pressure.

6 Claims, No Drawings

METHOD OF PRODUCING NON-OXIDE CERAMIC SINTERED BODIES

BACKGROUND OF THE INVENTION

1. Field of the Invention

This invention relates to a method of economically producing non-oxide ceramic sintered bodies of high quality by subjecting a non-oxide ceramic shaped body to hydrostatic pressing treatment and/or machining without damaging and then sintering. Particularly, it is concerned with the production of silicon nitride articles having a complicated shape such as a turbocharger rotor, sub-combustion chamber of a diesel engine, and the like.

2. Related Art Statement

Heretofore, it was very difficult to machine such ceramic articles after sintering. Thus it was important to reduce the amount of machining necessary after the sintering by previously shaping the ceramic body into a shape as close as possible to that of the final product after the sintering, thus reducing the time and expense required to manufacture the article.

In general, when applying a shaping method capable of forming only a relatively simple shape such as mold pressing or the like, the solution of the above problem is achieved by subjecting the shaped body to a machining before the sintering. However, the shaped body before the sintering is very brittle, so that it is necessary to calcine the body before machining to increase the strength of the shaped body.

As non-oxide ceramics, nitrides such as silicon nitride, aluminum nitride and the like are calcined in a nitrogen gas atmosphere for preventing decomposition of the starting material. However, in the conventional method, the strength of the shaped body is not sufficiently increased, and consequently there is a problem of chipping and the like during the machining.

Further, when using shaping methods such as injection molding, slurry casting or the like, which are capable of forming a complicated shape, a shaped body requiring no machining after the shaping step can be obtained. However, it is desired to further increase the density of the shaped body for obtaining a higher density ceramic body. In this connection, Japanese Patent laid open No. 55-20259 discloses a method of producing a high density ceramic body wherein the shaped body obtained by the injection molding method is covered with rubber latex, subjected to a hydrostatic pressing treatment and then sintered. This technique has a drawback that since the shrinkage of the shaped body is different between the surface and the inside in the hydrostatic pressing, strain is caused after the hydrostatic pressing to thereby injure the hydrostatic pressed body. Therefore, it is considered that the shaped body can not finally overcome the generated strain because the strength is low.

Moreover, a method of raising the calcining temperature is generally known as the method of increasing the strength of the shaped body. However, as the calcining temperature becomes higher, the strength of the calcined body rapidly increases (i.e., approaches that of a sintered body); so that it is very difficult to control the calcining temperature for obtaining the desired strength.

SUMMARY OF THE INVENTION

It is, therefore, an object of the invention to properly reinforce the non-oxide shaped body with a good reproducibility, whereby non-oxide ceramic sintered bodies having high quality can economically be produced without damage, even when being subjected to a machining and/or a hydrostatic pressing treatment.

According to the invention, there is the provision of a method of producing a non-oxide ceramic sintered body, comprising calcining a non-oxide ceramic shaped body in an atmosphere having a partial oxygen;. pressure of 100 ppm~10000 ppm, subjecting the calcined body to a machining and/or hydrostatic pressing treatment, and then sintering the body.

DESCRIPTION OF THE PREFERRED EMBODIMENTS

In the invention, the reason why the non-oxide ceramic shaped body is calcined in an atmosphere having a partial oxygen pressure of 100 ppm 10000 ppm is based on the fact that the shaped body is reinforced by not only slightly oxidizing the non-oxide ceramic starting powder, through the slight amount of oxygen contained in the atmosphere for the calcination, but also lightly bonding the particles of the starting powder to each other. When the partial oxygen pressure is less than 100 ppm, the reinforcement of the shaped body becomes insufficient. When the partial oxygen pressure exceeds 10000 ppm, the oxidation becomes excessive to increase the strength of the shaped body and reduce the effect of the subsequent hydrostatic pressing treatment, and also, the amount of oxygen included in the starting powder becomes excessively large.

The heating condition in the calcination is not particularly restricted because it differs in accordance with the kind of non-oxide ceramics. However, when the non-oxide ceramic is silicon nitride, it is preferable that the shaped body is held at a temperature of 800° C.~1300° C. for 1~3 hours.

Further, the sintering conditions differ in accordance with the kind of non-oxide ceramics, so that they are not particularly restricted. For example, when the non-oxide ceramic is silicon nitride, the sintering is preferably carried out at 1600°~1900° C. in a nitrogen gas atmosphere for 1~3 hours.

According to the invention, the shaped body may be subjected to hot pressing or hot isostatic pressing under a large load during sintering.

The following examples are given in illustration of the invention and are not intended as limitations thereof.

EXAMPLE 1

20 kg of silicon nitride powder having a purity of not less than 99.5%, an α-phase content of not less than 95% and an average particle size of 0.6 μm was mixed with 1.5% of SrO, 5% of MgO and 4% of $CeO_2$, charged into a ball mill and wet-mixed with pebbles of $ZrO_2$ for 6 hours.

PVA in an amount of 2% per starting dried material was then added to the mixed slurry, and the mixture was PVA in an spray-dried to obtain a granulated pressing material.

The pressing material was shaped under a pressure of 200 kg/cm² into a square plate of 60 mm × 60 mm × 10 mm, which was placed in a thin rubber bag, sealed, subjected to a hydrostatic pressing treatment under a pressure of 2.5 ton/cm$^2$ and held at 500° C. for 20 hours to conduct degreasing whereby a binder was completely removed to obtain a shaped body.

The resulting shaped body was calcined by holding at 1000° C. in a nitrogen gas atmosphere having a partial oxygen pressure of 10$^4$ ppm, 10$^2$ ppm or 10$^{-16}$ ppm for 1 hour.

Each of the calcined bodies was then fixed to a milling machine and subjected to a drilling operation with a slotting end mill of 10φ, and thereafter the worked state was observed to obtain results as shown in the following Table 1.

TABLE 1

| Sample No. | 1 | 2 | 3 | 4 |
|---|---|---|---|---|
| Partial oxygen pressure in calcination ppm) | 10$^4$ | 10$^2$ | 10$^{-16}$ | (no calcination) |
| Chipping | none | none | presence | presence |
| Remarks | acceptable | acceptable | unacceptable | unacceptable |

As seen from Table 1, in Sample Nos. 3 and 4 wherein the partial oxygen pressure in the calcination was less than 100 ppm, chipping occurred during machining.

EXAMPLE 2

20 kg of silicon nitride powder having a purity of not less than 99.5%, an α-phase content of not less than 95% and an average particle size of 0.6 μm was mixed with 1.5% of SrO, 5% of MgO and 4% of CeO$_2$, charged into a ball mill and wet-mixed with pebbles of ZrO$_2$ for 6 hours.

The resulting mixed slurry was dried by means of a spray drier, a binder, for injection molding composed mainly of paraffin wax, was added, the mixture was kneaded with a heating kneader at 100° C. under a pressure for 1 hour, cooled and pulverized in the kneader to obtain a starting material for injection molding.

A turbocharger rotor was shaped by using the above starting material in an injection molding machine of an in-line screw system at a temperature of 70° C. under an injection pressure of 1.0 ton/cm$^2$, held at a temperature of 500° C. for 20 hours to conduct degreasing, whereby the binder was completely removed to obtain a shaped body.

The resulting shaped body was calcined by holding at 1000° C. in a nitrogen gas atmosphere having a partial oxygen pressure of 10$^5$ ppm, 10$^4$ ppm, 10$^2$ ppm or 10$^{-16}$ ppm for 1 hour.

The shaft portion of the calcined turbocharger rotor shaped body was cut, covered with a rubber latex, subjected to a hydrostatic pressing treatment under a pressure of 4.5 ton/cm$^2$, and thereafter the rubber layer was removed to measure the strength, oxygen content and density of the shaped body. The measured results are shown in the following Table 2.

TABLE 2

| Sample No. | 5 | 6 | 7 | 8 | 9 |
|---|---|---|---|---|---|
| Partial oxygen pressure in calcination (ppm) | 10$^5$ | 10$^4$ | 10$^2$ | 10$^{-16}$ | (no calcination) |
| Increment of oxygen content after calcination (%) | 1.1 | 0.2 | 0.2 | 0 | — |
| Strength after hydrostatic pressing (kg/cm$^2$) | 350 | 88 | 82 | 67 | 54 |
| Density after hydrostatic pressing (g/cc) | 1.88 | 2.06 | 2.06 | 2.08 | 2.10 |
| Remarks | unacceptable | acceptable | acceptable | unacceptable | unacceptable |

On the other hand, the calcined turbocharger rotor shaped body was covered with a rubber latex, subjected to a hydrostatic pressing treatment under a pressure of 4.5 ton/cm$^2$, embedded in an activated alumina, heated at 500 C. for 10 hours to burn out the rubber layer, and then taken out from the activated alumina to observe the appearance. The results are shown in the following Table 3.

TABLE 3

| Sample No. | 10 | 11 | 12 | 13 | 14 |
|---|---|---|---|---|---|
| Partial oxygen pressure in calcination (ppm) | 10$^5$ | 10$^4$ | 10$^2$ | 10$^{-16}$ | (no calcination) |
| Cracking | none | none | none | presence | presence |
| Remarks | unacceptable | acceptable | acceptable | unacceptable | unacceptable |

As seen from the above results, when the partial oxygen pressure is low, the strength after the hydrostatic pressing is not so high and cracking occurs. On the other hand, when the partial oxygen pressure is high, the increment of oxygen content becomes large and the densification effect through the hydrostatic pressing treatment is lowered. Moreover, when the partial oxygen pressure is within a range of 100 ppm~10000 ppm, the change of the properties is very moderate and can easily be controlled.

According to the invention, ceramic products requiring high properties and having a complicated shape such as a sub-combustion chamber of a diesel engine, a turbocharger rotor and the like can economically be produced without lowering the product yield by calcining in an atmosphere having a partial oxygen pressure of 100 ppm~10000 ppm for preventing damage to the product when being subjected to a machining and/or hydrostatic pressing treatment.

What is claimed is:

1. A method of producing a non-oxide ceramic sintered body, comprising calcining a non-oxide ceramic shaped body in an atmosphere having a partial oxygen pressure of 100 ppm~10000 ppm, machining the calcined body, and sintering the machined body.

2. A method of producing a non-oxide ceramic sintered body, comprising calcining a non-oxide ceramic shaped body in an atmosphere having a partial oxygen pressure of 100 ppm~10000 ppm, subjecting the calcined body to a hydrostatic pressing treatment, and sintering the pressed body.

3. The method according to claim 1, wherein said non-oxide ceramic shaped body consists of a silicon nitride shaped body.

4. The method according to claim 3, wherein said atmosphere consists essentially of nitrogen.

5. The method according to claim 2, wherein said non-oxide ceramic shaped body consists of a silicon nitride shaped body.

6. The method according to claim 5, wherein said atmosphere consists essentially of nitrogen.

* * * * *